(12) United States Patent
Misala et al.

(10) Patent No.: US 8,882,633 B2
(45) Date of Patent: Nov. 11, 2014

(54) ASSEMBLY WITH A COMBUSTION ENGINE, AN ELECTRIC MACHINE AND A PLANETARY GEAR TRAIN ARRANGED THEREBETWEEN, AS WELL AS A METHOD FOR CHANGING AN OPERATING MODE OF SUCH ASSEMBLY

(75) Inventors: Andreas Misala, Sachsenheim (DE); Johann Mendle, Wörth (DE)

(73) Assignee: Audi AG, Ingolstadt (DE)

( * ) Notice: Subject to any disclaimer, the term of this patent is extended or adjusted under 35 U.S.C. 154(b) by 224 days.

(21) Appl. No.: 13/362,935

(22) Filed: Jan. 31, 2012

(65) Prior Publication Data

US 2013/0029803 A1 Jan. 31, 2013

(30) Foreign Application Priority Data

Feb. 1, 2011 (DE) .......................... 10 2011 010 093

(51) Int. Cl.
| | |
|---|---|
| *B60W 10/02* | (2006.01) |
| *H02K 7/116* | (2006.01) |
| *F16H 55/36* | (2006.01) |
| *F16H 3/54* | (2006.01) |
| *B60K 25/02* | (2006.01) |
| *B60K 17/02* | (2006.01) |
| *H02K 7/108* | (2006.01) |

(52) U.S. Cl.
CPC .......... *H02K 7/116* (2013.01); *F16H 2055/363* (2013.01); *F16H 3/54* (2013.01); *B60K 2025/022* (2013.01); *B60K 17/02* (2013.01); *H02K 7/108* (2013.01); *F16H 2055/366* (2013.01)
USPC ............................................................ 477/5

(58) Field of Classification Search
USPC ............. 475/5, 149, 301, 162, 175, 154, 257, 475/258, 259, 331, 317, 269, 261, 318, 475/322; 477/5, 3; 180/65.265, 65.235; 903/910, 914, 946
See application file for complete search history.

(56) References Cited

U.S. PATENT DOCUMENTS

| | | | | |
|---|---|---|---|---|
| 4,878,401 | A * | 11/1989 | Chung ......................... | 475/153 |
| 5,358,456 | A * | 10/1994 | Deppert et al. ............... | 475/154 |
| 5,842,944 | A | 12/1998 | Morishita | |
| 6,048,288 | A * | 4/2000 | Tsujii et al. ...................... | 477/5 |
| 6,093,974 | A * | 7/2000 | Tabata et al. ................ | 290/40 R |
| 6,333,577 | B1 * | 12/2001 | Kusumoto et al. ......... | 310/102 R |

(Continued)

FOREIGN PATENT DOCUMENTS

| | | |
|---|---|---|
| DE | 41 18 853 A1 | 12/1992 |
| DE | 101 52 472 A1 | 5/2003 |

(Continued)

*Primary Examiner* — Saul Rodriguez
*Assistant Examiner* — David J Hlavka
(74) *Attorney, Agent, or Firm* — Henry M Feiereisen LLC

(57) ABSTRACT

An assembly with a combustion engine and an electric machine, which are coupled with each other by way of a planetary gear train, employs a claw clutch or a toothed clutch, in particular as a brake, between a ring gear of the planetary gear train and a housing of the combustion engine. For this purpose, rotation speeds of the electric machine and the combustion engine set commensurate with a fixed gear ratio, and the brake is closed after the set rotation speeds have been attained with a predetermined minimum accuracy. In this way, machine elements which are compact and operate with insignificant wear, such as claw clutches or toothed clutches, can be employed as the clutch or brake.

10 Claims, 1 Drawing Sheet

(56) References Cited

U.S. PATENT DOCUMENTS

| | | |
|---|---|---|
| 6,719,655 B2 | 4/2004 | Kramer |
| 6,832,970 B2 | 12/2004 | Eibler |
| 6,878,094 B2 * | 4/2005 | Kitamura et al. ............ 477/5 |
| 7,028,794 B2 * | 4/2006 | Odahara et al. ........ 180/65.25 |
| 2003/0045389 A1 * | 3/2003 | Kima ......................... 475/5 |
| 2006/0019786 A1 * | 1/2006 | Asa et al. .................... 475/5 |

FOREIGN PATENT DOCUMENTS

| | | |
|---|---|---|
| DE | 102006037577 | 2/2008 |
| DE | 102006053139 | 5/2008 |
| EP | 1 282 772 | 2/2003 |
| EP | 1 459 931 A1 | 9/2004 |
| EP | 1 555 456 A2 | 7/2005 |
| JP | 56 148133 U | 11/1981 |

* cited by examiner

ASSEMBLY WITH A COMBUSTION ENGINE, AN ELECTRIC MACHINE AND A PLANETARY GEAR TRAIN ARRANGED THEREBETWEEN, AS WELL AS A METHOD FOR CHANGING AN OPERATING MODE OF SUCH ASSEMBLY

CROSS-REFERENCES TO RELATED APPLICATIONS

This application claims the priority of German Patent Application 10 2001 010 093.8, filed Feb. 1, 2011, pursuant to 35 U.S.C. 119(a)-(d), the content of which is incorporated herein by reference in its entirety as if fully set forth herein.

BACKGROUND OF THE INVENTION

The present invention relates to a method for changing an operating mode in an assembly with a combustion engine and an electric machine which are coupled with each other via a planetary gear train, an assembly with a combustion engine with a crankshaft and an electric machine with a rotor, which are coupled with one another via a planetary gear train, and a motor vehicle with such assembly.

The following discussion of related art is provided to assist the reader in understanding the advantages of the invention, and is not to be construed as an admission that this related art is prior art to this invention.

It is the objective of this assembly to operate the electric machine both as a starter motor for the combustion engine and as a generator driven by the combustion engine. Different gear ratios can be set by suitable placement of clutches and/or overrunning clutches in the planetary gear train or between other elements of the assembly. For example, the electric machine rotates relatively faster preferably during startup of the combustion engine than when the electric machine operates as a generator.

It will be assumed here that a specific clutch, upon closing, adjusts the gear ratio between the electric machine and the combustion engine to a fixed value, whereas when the clutch is open, either no fixed value is set or another value is set—this can be defined by other clutches and overrunning clutches.

To date, friction clutches have been used in such assemblies. However, these have large dimensions, because they must transmit large torques in particular during startup of the combustion engine.

It would therefore be desirable and advantageous to obviate prior art shortcomings and to provide an approach for reducing the overall dimensions of the assembly.

SUMMARY OF THE INVENTION

According to one aspect of the present invention, a method of changing an operating mode of an assembly comprised of a combustion engine and an electric machine which are coupled with one another by a planetary gear train having a clutch, includes defining a fixed value of a transmission ratio between the electric machine and the combustion engine, setting a rotation speed of a rotor of the electric machine and a rotation speed of a crankshaft of the combustion engine such that a ratio of the rotation speed of a rotor of the electric machine and the rotation speed of a crankshaft has the fixed value within a predetermined minimum accuracy, and closing the clutch when the rotation speed of a rotor of the electric machine and the rotation speed of a crankshaft attain the set rotation speeds.

According to another aspect of the invention, an assembly includes a combustion engine having a crankshaft, an electric machine having a rotor, a planetary gear train coupling the combustion engine and the electric machine, a clutch for adjusting a predetermined gear ratio between the rotor and the crankshaft, and a control device for controlling the clutch and for controlling at least one member selected from the group consisting of the electric machine and the combustion engine. The control device is configured to adjust a rotation speed of the rotor and a rotation speed of the crankshaft with a defined minimum accuracy commensurate with the predetermined gear ratio before the control device causes the clutch to close.

The invention is also directed to a motor vehicle incorporating the aforedescribed assembly.

According to an advantageous feature of the present invention, when the clutch is open, the rotation speeds of a rotor of the electric machine and a crankshaft of the combustion engine may be adjusted, so that they have—with a predetermined minimum accuracy—an exact mutual ratio that corresponds to the fixed value to which the gear ratio is adjusted when the clutch is closed. Only then is the clutch closed.

In other words, the electric machine and the combustion engine may be synchronized with one another such that a rotation speed difference between the components, which are coupled with each other by the clutch, is smaller than a predetermined value. According to an advantageous feature of the present invention, a positive-locking clutch may be used, i.e. a clutch which establishes upon closing a positive connection between two elements or components. In particular, a toothed clutch or a claw clutch may be used, which can be inserted, with such clutches having significantly smaller dimensions than friction clutches for comparable maximum torques. In this way, space can be saved in the assembly and thus in a motor vehicle.

The method according to the invention and the assembly according to the invention allow, in particular, a so-called "change-of-mind" operation (change of mind by the driver): if an operator lets the motor vehicle coast and thereafter changes his mind, while the rotation speed of the combustion engine and of the electric machine has already decreased, and accelerates again (by pressing the gas pedal), then the combustion engine should be accelerated as quickly as possible. According to an advantageous feature of the present invention, this may be accomplished by initially briefly pre-accelerating the electric machine before the clutch is closed. This approach is particularly efficient, also compared to previous approaches where a friction clutch is closed immediately when the gas pedal is pressed after coasting. This previous approach may briefly cause an excessive longitudinal force and slip in a belt drive arranged between the combustion engine and the electric machine.

According to an advantageous feature of the present invention, wherein the combustion engine is coupled with a planet carrier, the electric machine may be coupled with an element composed of a sun gear and a ring gear of the planetary gear train, and wherein the other element of the planetary gear train composed of the sun gear and the ring gear may be locked with a clutch to a fixed component of the combustion engine or a component which is fixed in relation to the combustion engine. When the clutch is open, the rotation speed of the rotor is adjusted so that the other element comes to a standstill with a predetermined minimum accuracy, before the clutch is closed.

According to another advantageous feature of the present invention, the assembly may include a device for controlling the clutch and for controlling the combustion engine and/or the electric engine such that the rotation speeds of the rotor and the crankshaft are adjusted with a minimum accuracy commensurate with the predetermined gear ratio, which can be set with the clutch, before the device then closes the clutch.

The control device may hence control, in an uncertain situation, first the electric machine, optionally also the combustion engine, and only thereafter the clutch. In particular, the control device may receive control commands, e.g. information about the position of a gas pedal sensor and the like.

According to another advantageous feature of the present invention, to attain small dimensions of the assembly of the invention, the clutch may be implemented as a positive-locking clutch, in particular a toothed clutch or claw clutch.

According to yet another advantageous feature of the present invention, an overrunning clutch may be arranged between the planet carrier and the element composed of sun gear or ring gear, with which the electric machine is coupled.

According to another advantageous feature of the present invention, the electric machine may be coupled with the planetary gear train by way of a belt drive, which obviates the need to arrange the electric machine at a particular location, which may then be arranged more or less on the side of the combustion engine or the planetary gear train, allowing the assembly to be housed in the engine compartment of a motor vehicle without taking up much space. Additional units, for example a compressor for an air-conditioning system, may be coupled by way of a belt drive.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
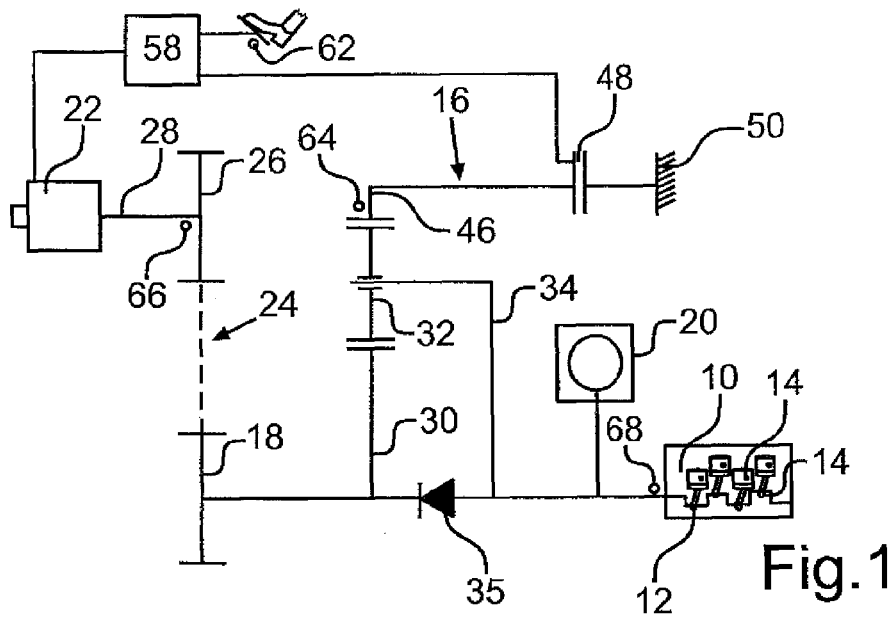
FIG. 1 is a schematic diagram illustrating the assembly according to the present invention of a combustion engine and a planetary gear train with an electric machine coupled thereto.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an assembly 16, which includes a planetary gear train, to which a pulley 18 is coupled, and a vibration damping unit 20, is coupled to a combustion engine 10 with a crankshaft 12 which can be set into rotation through movement of pistons disposed in combustion chambers 14. The pulley 18 operates to couple an electric machine 22 by way of a belt drive 24, which includes a pulley 26, with the pulley 26 being connected to a shaft 28 for rotation with an (unillustrated) rotor of the electric machine 22.

The planetary gear train includes a sun gear 30 connected with the pulley 18 and meshing with planetary gears 32 which are connected with each other via a planet carrier 34. An overrun clutch 35 is arranged between the planet carrier 34 and the sun gear 30. The planet carrier 34 is connected with the crankshaft 12 by way of a flange 36. The flange is screwed to the crankshaft 12 with axial screws 38. A support plate 40 is clamped between the flange 36 and the crankshaft 12, with a rubber ring 32 carrying a steel ring 44 disposed on the support plate 40. The support plate 40, the rubber ring 42 and the steel ring 44 form the vibration damping unit 20.

A ring gear 46 of the planetary gear train is connected by way of a brake 48 (hereinafter also referred to as clutch) with a component 50 that is fixed in relation to the combustion engine. The brake 48 includes an electromagnet 52, which is attached to the component that is fixed in relation to the combustion engine, and which is configured to pull in an armature 54 connected with the ring gear 46.

Figure 2:
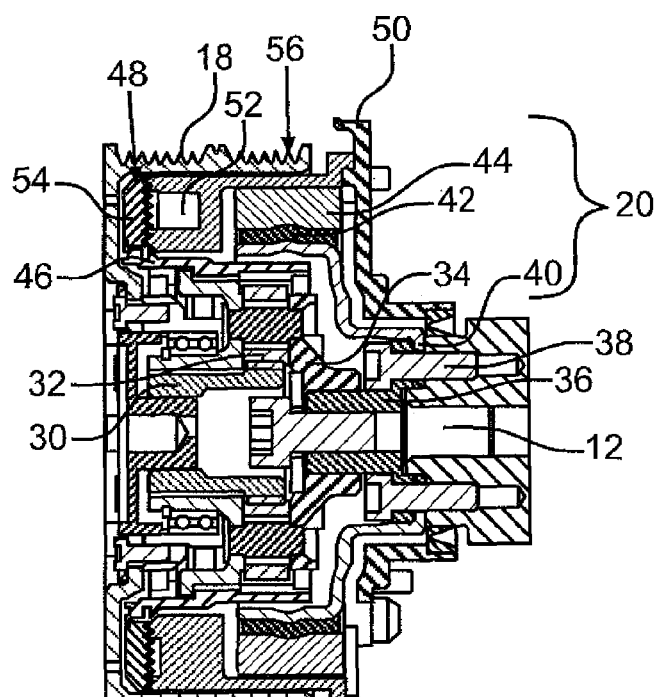
FIG. 2 shows in a radial cross-section the planetary gear train with a pulley of the belt drive and a vibration damping unit.

As seen in FIG. 2, the steel ring 44 with the rubber ring 42, on one hand, and the electromagnet 52 and the armature 54, on the other hand, are arranged in the same radial region, i.e. exactly between the radially outer section of the pulley 18 having an exterior profile 56 and the outermost ring gear 46. These elements can be particularly well a housed at this location.

According to an advantageous feature of the illustrated assembly, the brake 48 operates with a positive lock, implemented in particular as a claw clutch or toothed clutch. The armature 54 may have a tooth pattern complementary to a tooth pattern of the electromagnet 52. A positive-locking brake 48 cannot be closed in any conceivable situation without causing damage. In particular, the ring gear 46 must not significantly rotate when the brake 48 is closed. This is made possible by a control device 58:

It will be assumed that the brake 48 needs to be closed. This may be the case when a vehicle operator initially lets the vehicle coast from an ongoing motion, while the electric machine 22 operates as a generator and the rotation speeds of the shaft 28 and of the crankshaft 12 decrease together. If the vehicle operator then desires to accelerate the vehicle again, he steps on the gas pedal 60, which is measured by a sensor 62 detecting the position of the gas pedal 60, with the measurement values being supplied to the control device 58. It would now be necessary to accelerate the combustion engine 10 with the electric machine 22, which would require the brake 48 to be closed. In preparation for this event, the control device 58 synchronizes the rotation of the shaft 28 with that of the crankshaft 12 such that the gear ratio, which is fixedly defined by the missing degree of freedom when the brake 48 closes, is already set. This gear ratio is, for example, 3:1. The gear ratio is adjusted by accelerating the rotation of the shaft 28, with the assumption that the rotation speed of the crankshaft 12 at the same time continues to decrease further. When the ratio of the rotation speeds is adjusted commensurate with the gear ratio, the ring gear 26 barely rotates or is at a standstill. This can be measured, for example, with a rotation speed counter 64 on the ring gear 46; as well as optionally indirectly with a rotation speed counter 66 on the shaft 28 and a rotation speed counter 68 on the crankshaft 12. In general, it may for example be stipulated that the ring gear 46 rotates at most with a rotation speed of 50 RPM relative to the housing 50 of the combustion engine. The control device 58 then closes the brake 48, and the combustion engine 10 is effectively accelerated by the electric machine 22.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. An arrangement, comprising:
a combustion engine having a crankshaft;
an electric machine having a rotor;
a planetary gear coupling the combustion engine and the electric machine;
a clutch for adjusting a predetermined gear ratio between the rotor and the crankshaft; and
a control device for adjusting in an open position of the clutch at least one of a rotation speed of the rotor and a rotation speed of the crankshaft so as to synchronize the at least one rotation speed of the rotor and the crankshaft to the predetermined gear ratio before the control device causes the clutch to close,
wherein the planetary gear train comprises a planet carrier coupled with the combustion engine, a sun gear coupled with the electric machine and a ring gear, wherein the clutch is implemented as a positive-locking clutch constructed to establish a positive-locking connection between the ring gear and a component that is fixed in relation to the combustion engine.

2. The arrangement of claim 1, wherein the planetary gear comprises an armature connected with the ring gear, an electromagnet attached to the component that is fixed in relation to the combustion engine, wherein the clutch is constructed to establish a positive-locking connection between the electromagnet and the armature.

3. The arrangement of claim 2, wherein the clutch is constructed as a toothed clutch or a claw clutch.

4. The arrangement of claim 1, further comprising an overrunning clutch arranged between the planet carrier and a sun wheel of the planetary gear.

5. The arrangement of claim 1, wherein the electric machine is coupled with the planetary gear by way of a belt drive.

6. A motor vehicle comprising:
a combustion engine having a crankshaft;
an electric machine having a rotor;
a planetary gear coupling the combustion engine and the electric machine;
a clutch for adjusting a predetermined gear ratio between the rotor and the crankshaft; and
a control device for adjusting in an open position of the clutch at least one of a rotation speed of the rotor and a rotation speed of the crankshaft so as to synchronize the at least one rotation speed of the rotor and the crankshaft to the predetermined gear ratio before the control device causes the clutch to close,
wherein the planetary gear train comprises a planet carrier coupled with the combustion engine, a sun gear coupled with the electric machine and a ring gear, wherein the clutch is implemented as a positive-locking clutch constructed to establish a positive-locking connection between the ring gear and a component that is fixed in relation to the combustion engine.

7. The motor vehicle of claim 6, wherein the planetary gear train comprises an armature connected with the ring gear, an electromagnet attached to the component that is fixed in relation to the combustion engine, wherein the clutch is constructed to establish a positive-locking connection between the electromagnet and the armature.

8. The motor vehicle of claim 7, wherein the clutch is constructed as a toothed clutch or a claw clutch.

9. The motor vehicle of claim 6, further comprising an overrunning clutch arranged between the planet carrier and a sun gear of the planetary gear train.

10. The motor vehicle of claim 6, wherein the electric machine is coupled with the planetary gear train by way of a belt drive.

* * * * *